United States Patent

Hamel et al.

[11] Patent Number: 5,943,402
[45] Date of Patent: Aug. 24, 1999

[54] METHOD FOR ANNOTATING AND EDITING VOICE MESSAGES VIA ACOUSTIC BULLET POINTS

[75] Inventors: Kenneth L. Hamel, Boulder; Louis A. Cox, Denver, both of Colo.; Hans-Peter Mueller, Las Vegas, Nev.

[73] Assignees: U S West, Inc., Denver; MediaOne Group, Inc., Englewood, both of Colo.

[21] Appl. No.: 08/791,795

[22] Filed: Jan. 29, 1997

[51] Int. Cl.⁶ .................................................. H04M 1/64
[52] U.S. Cl. ........................................ 379/88.26; 379/76
[58] Field of Search .............................. 379/88.12, 88.24, 379/88.25, 88.26, 88.22, 88.23, 74, 75, 76

[56] References Cited

U.S. PATENT DOCUMENTS

| | | |
|---|---|---|
| 4,375,083 | 2/1983 | Maxemchuk .......................... 364/900 |
| 4,625,081 | 11/1986 | Lotito et al. ............................. 379/196 |
| 5,008,835 | 4/1991 | Jachmann et al. ..................... 364/513.5 |
| 5,367,609 | 11/1994 | Hopper et al. ....................... 379/88.08 |
| 5,481,597 | 1/1996 | Given ................................... 379/88.23 |

*Primary Examiner*—Fan S. Tsang
*Attorney, Agent, or Firm*—Holme, Roberts & Owen LLP

[57] ABSTRACT

A method and system for segmenting and acting upon segments of, for example, a previously generated voice message by inserting audible interrupts into the voice message for partitioning the voice message into segments. Upon initiating or encountering such an interrupt in a voice message, a subscriber may act upon a segment adjacent to the interrupt. Actions on the adjacent segment include replaying the segment, forwarding the segment to an addressee with comments, deleting the segment, or no action although retaining the option of future action on the adjacent segment. Furthermore, the inserted interrupts may be inserted by the originating party of the voice message for action by the originating party, or by the originating party for future action by another receiving party.

21 Claims, 10 Drawing Sheets

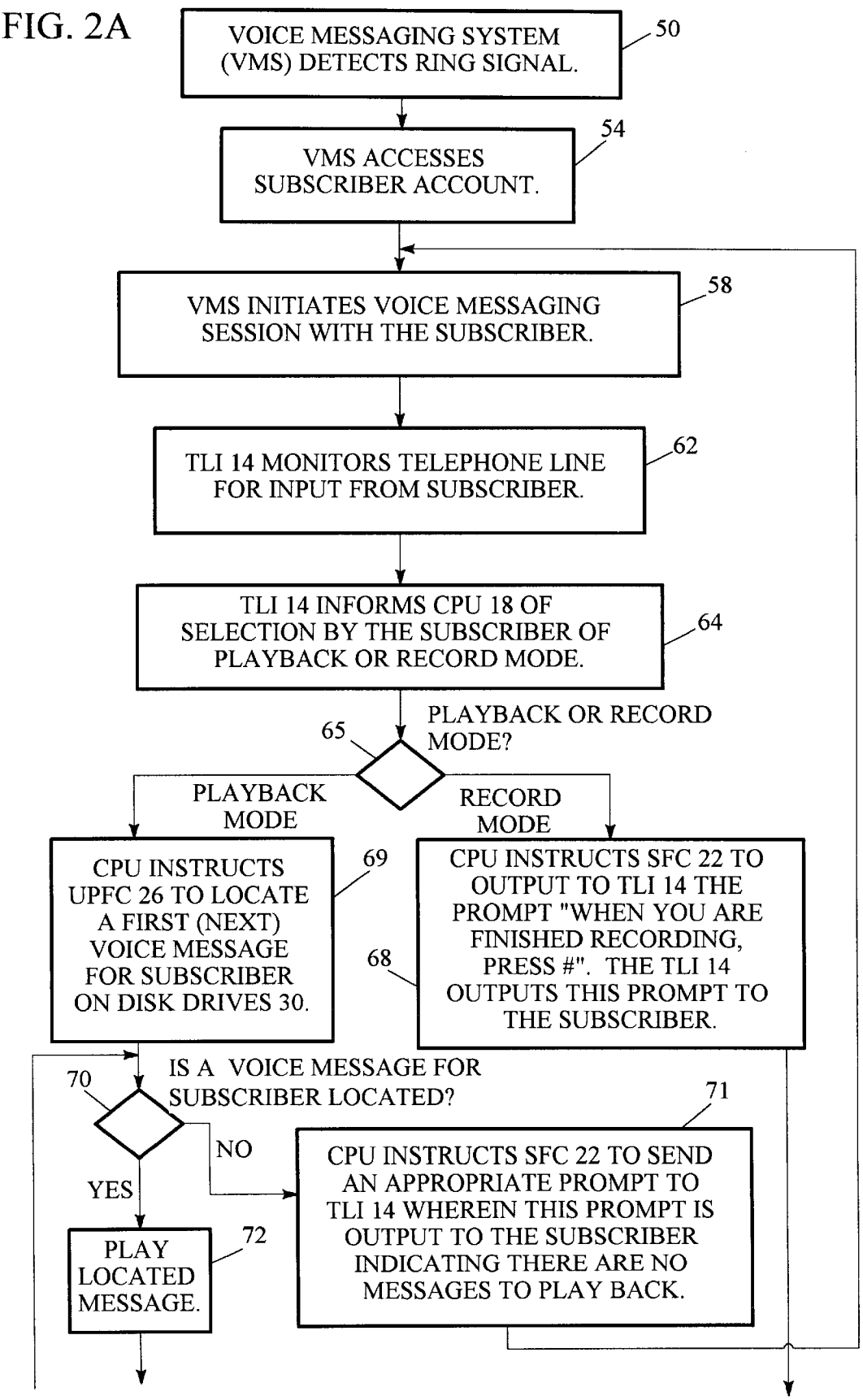

METHOD FOR ANNOTATING AND EDITING VOICE MESSAGES VIA ACOUSTIC BULLET POINTS

FIELD OF THE INVENTION

The present invention relates to voice messaging systems, and in particular, voice messaging systems having a capability to edit voice messages at user selectable points within a voice message.

BACKGROUND

Voice messaging systems have become increasingly popular as a means for subscribers to such a system to convey audio messages to addressees within the voice messaging system. Existing voice messaging systems offer a subscriber such standard features as the ability to receive messages in a pre-defined mailbox, the ability for subscribers to access the pre-defined mailbox using, for example, the standard digits on a touch-tone telephone keypad, and the ability for the subscriber to delete, respond to, and forward messages in the mailbox. However, voice message subscribers (i.e., addressees) can become frustrated when receiving messages containing redundant introductory information. For example, it can often take up to thirty seconds to listen to the various introductions to a voice message pre-appended by each subscriber as the message moves through an organization. Voice mail addressees are also frustrated by receiving a voice mail message having a combination of proprietary and public information. The state of the art for voice messaging systems is such that there is no way for the originator of a voice message to allow a voice mail addressee to move through and act upon particular, pre-defined segments of a voice message. More generally, there currently does not exist a simple method for the voice mail addressee to eliminate excess message information and/or re-use a particular segment(s) of a received voice message, wherein, for example, the segment is determined by the message originator. Accordingly, it would be desirable to provide a voice messaging system and a method whereby a voice messaging system subscriber may pre-define segments within a voice mail message for current action by the subscriber, for later action by the subscriber, or for later action by an addressee to which the message is sent.

Additionally, many subscribers of voice messaging systems have experienced frustration when attempting to respond to or forward only a segment of a voice message that exists within a lengthy message. Accordingly, it would also be desirable to provide a method and system whereby a subscriber may define segments within a voice mail message and operate on each of the defined segments independently.

SUMMARY OF THE INVENTION

The inability for independent action upon segments of voice mail messages by message originators and message addressees is overcome by the present invention. The present invention is a method and system for segmenting voice messages and acting upon segments of voice messages by inserting a single audible interrupt or multiple audible interrupts into a voice message wherein upon encountering such an interrupt in a voice message, a user or subscriber to the present invention may act upon a segment adjacent to the interrupt. Actions on such a voice mail segment include replaying the segment, forwarding the segment to an addressee with comments, forwarding the entire message to an addressee with embedded(potentially segmented) comments, deleting the segment, skipping playback of the segment, or partitioning the segment into smaller segments. Thus, in particular, the present invention is novel in that each such segment (with or without its own embedded interrupts) may be utilized and manipulated autonomously as a typical voice mail message having no such interrupts. Additionally, note that since the interrupts are merely embedded as audible tones, voice messages generated by the present invention and having such interrupts may be manipulated by a prior art voice mail system utilizing a same voice mail message data structure, but not having the capability to act upon the interrupts. Furthermore, the interrupts defining the segments may be inserted by an originating party of a message for applying different actions to different segments by the originating party or by an addressee. Furthermore, the present invention provides a method and system for modifying a voice message by inserting such an interrupt (also hereinafter denoted as an "acoustic bullet point" or "acoustic bullet") via, for example, telephony subscriber control signals generated by a standard twelve key touch-tone telephone keypad.

Other features and benefits of the present invention will become apparent from the detailed description and the accompanying figures contained herein.

DETAILED DESCRIPTION

Figure 1:
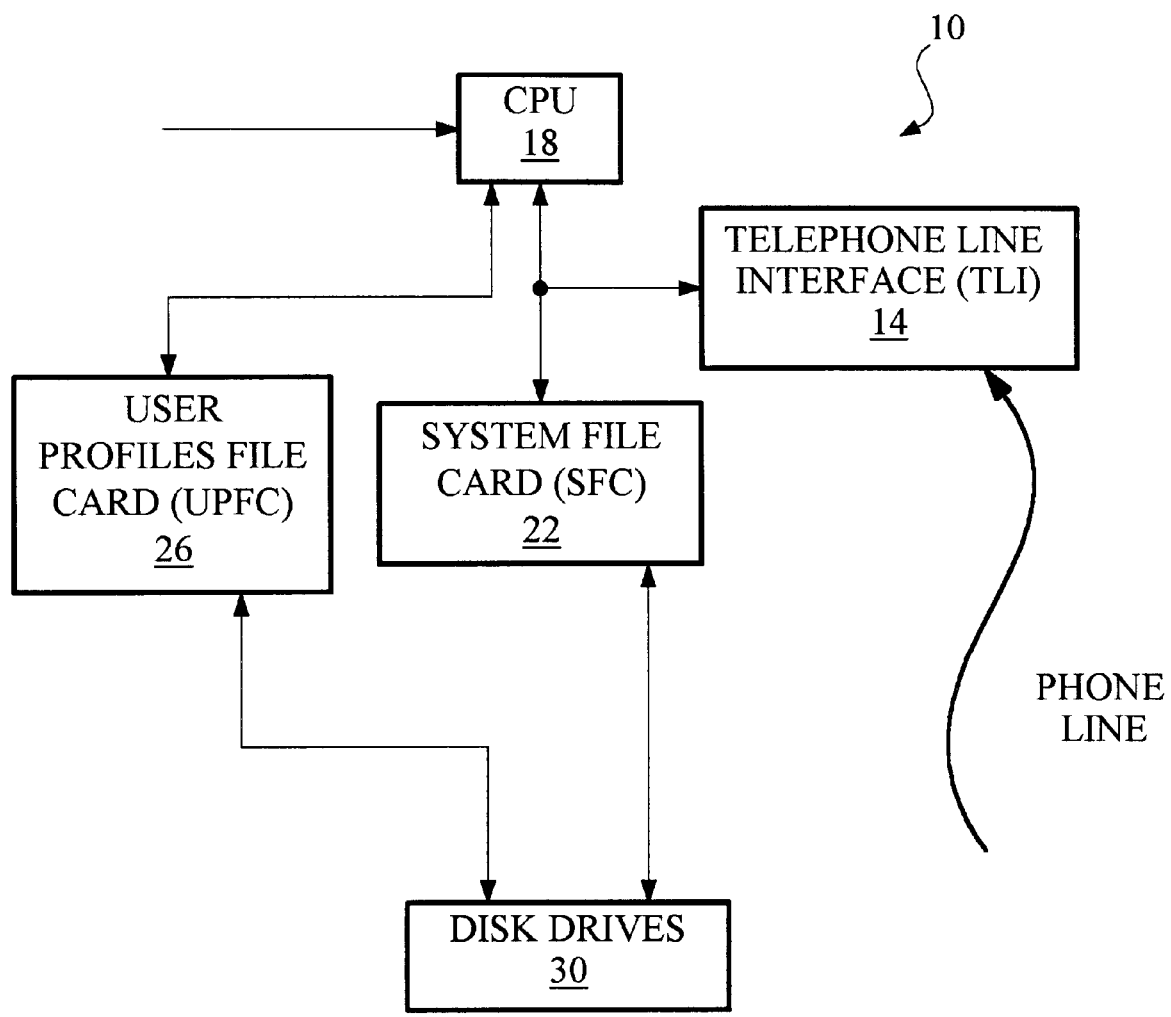
FIG. 1 is a block diagram of a voice messaging system 10 for the present invention.

FIG. 1 shows a high level block diagram of an automated voice messaging system 10 (VMS) for the present invention. Note that the voice messaging system 10 of FIG. 1 is described in simplified terms without reference to details of design which are not necessary for an understanding of the subject invention. The telephone line interface (TLI) 14 detects both voice signals and dual tone multiple frequency (DTMF) signals generated by a standard touchtone telephone having 12 keys, each one labeled with a distinct digit 0 through 9 or one of the symbols "*" and "#", and carried over a public switched telephone network 12 (PSTN) and/or one or more private branch exchanges (PBX) (not shown). The TLI 14 communicates telephony line information and call progress data as well as DTMF key press activity to the central processing unit (CPU) 18 which queries and updates a database denoted as the user profiles file card (UPFC) 26 having information regarding specific subscribers and their corresponding data base subscriber profiles (not shown). Note that each subscriber profile includes a password for access to the voice messaging system 10, the location on the disk drive 30 for storing incoming voice messages addressed for the subscriber, and other information about subscriber preferences. Subscribers to voice messages service 10 have the capability to modify and update information stored in the UPFC 26 via dual tone multiple frequency (DTMF) signals.

The CPU 18 also queries a database herein denoted the system file card (SFC) 22 for information regarding system prompts and general VMS 10 activity that is not subscriber specific such as appropriate responses to telephony call progress data and the location on the disk drives 30 of appropriate informational prompts to output to a subscriber.

In FIGS. 2A–2G, a flowchart is presented of the high level steps performed by the present invention. Accordingly, when a subscriber contacts VMS 10, as in step 50 of FIG. 2, a ring signal from the subscriber is detected by the TLI 14. Subsequently, in step 54, the VMS 10 accesses the subscriber's account, and in step 58, the VMS 10 offers the subscriber an introductory menu of options such as reviewing or originating a voice mail message and then determines what action the subscriber wishes to initiate (i.e., steps 62 and 64, as one skilled in the art will understand). Consequently, in step 65, a determination is made as to whether the subscriber has requested to playback or record a voice message. If the subscriber has requested to record a voice message, then in step 68, the CPU 18 instructs the SFC 22 to output to the TLI 14 a prompt for saying "When you are finished recording, press pound", and in turn, the TLI 14 outputs this voice prompt to the subscriber. Then in step 74, the CPU 18 instructs the TLI 14 to begin recording a voice message from the subscriber and in step 75, the VMS 10 waits for an interrupt from the subscriber while also recording the subscriber's voice message.

Alternatively, if in step 65 it is determined that the subscriber has requested to playback a voice message(s) in, for example, the subscriber's voice mailbox, then a flow of control path through the steps 69 through 73 is performed wherein the next voice message (if any) for the subscriber is located, playback commences and a determination is made as to whether an interrupt has occurred during message playback.

Subsequently, assuming that an interrupt is detected during voice message playback or recording, the playback or recording by the VMS 10 halts at the interrupt, and step 76 is performed wherein a determination is made as to what kind of interrupt occurred. Accordingly, interrupts are detected and processed as follows:

(1.1) An interrupt is detected for setting an acoustic bullet at the current location in the interrupted voice message (being played back or recorded). In one embodiment, the subscriber presses the key six on the telephone keypad during playback or recording of a voice message. Accordingly, the step 77 is subsequently performed wherein an acoustic bullet point is set at this interrupt. That is, after the TLI 14 detects the DTMF signal representing key six, the TLI informs the CPU 18 which, in response, instructs the TLI 14 to insert a DTMF signal of 770 Hz by 1447 Hz for 500 milliseconds into the present voice message as an acoustic bullet point. Thus, this inserted DTMF tone becomes part of the message and remains in the message until an action is performed by the subscriber (or a subsequent subscriber) that removes this acoustic bullet point. Further processing (commencing at step 85) is performed in response to subsequent subscriber voice message command requests, as will be described hereinbelow;

(1.2) An interrupt is detected that is an existing acoustic bullet encountered during a voice message. That is, the TLI 14 detects a 500 millisecond burst of the DTMF frequency for the key-press six (770 Hz by 1477 Hz) in the body of the voice message currently being processed. It should be noted, however, that the TLI 14 for the present invention is enhanced with functionality to determine whether the acoustic bullet point tone is embedded in a voice message or is emanating from the subscriber pressing the key six to insert an acoustic bullet point so that no additional (redundant) 500 millisecond DTMF acoustic bullet tone is inserted into the voice message. In either case, once the acoustic bullet point interrupt is detected, the step 78 is performed wherein the encountered acoustic bullet is marked or flagged as the current acoustic bullet point and further processing (commencing at step 84) is performed in response to subsequent subscriber voice message commands as will be described hereinbelow;

(1.3) An interrupt is detected indicating the end of the (current) voice message. The step 79 is subsequently performed wherein a playback options menu (having, e.g., message delete and save options) is presented to the subscriber. Following this, in step 80, the subscriber's option selection is performed and step 69 is again encountered for playback of any next message;

(1.4) An interrupt is detected wherein the subscriber requests either the presentation or the suppression of the menu (denoted hereinafter as the acoustic bullet main menu) as described in step 85 for presenting subscriber acoustic bullet commands. After interrupt detection, step 81 is performed wherein a flag is set for indicating whether the acoustic bullet main menu is to be presented to the subscriber. By suppressing the acoustic bullet point menu, the remainder of the voice message is uninterrupted during playback. Subsequently, step 75 is again encountered;

(1.5) A subscriber generated interrupt is detected for playback of the voice message being recorded. The step 82 is subsequently performed wherein the voice message already recorded by the subscriber is located (in the disk drives 30) and (in step 72) played; and (1.6) An interrupt is detected wherein the subscriber indicates that the recording of the current voice message is to be terminated (instead of merely interrupted). Accordingly, in step 83, the CPU 18 instructs the TLI 14 to stop recording the subscriber's message and (in step 58) the introductory menu is again presented so that the subscriber can: (a) playback the message just recorded, (b) delete this message, (c) re-record this message, or (d) playback other voice messages in the subscriber's mailbox, etc.

Regarding the steps of following the step 78, wherein a subscriber has encountered an acoustic bullet within a voice message, in step 84 a determination is made as to whether the acoustic bullet point main menu of step 85 is to be presented to the subscriber. Note that this determination is made according to the setting of the flag referenced in step 81. Thus, if this flag is set so that the main bullet point is not to be displayed, then although the tone for the current acoustic bullet point may be heard in the present voice message, the voice message continues to be played back immediately after 500 millisecond acoustic bullet point tone ceases. Accordingly, this behavior is indicated by the go to step 75 labeled the "NO" branch exiting from decision step 84.

Alternatively, if either step 84 yields a positive result, or, an acoustic bullet point has just been set (in step 77), then (in step 85) the acoustic bullet point main menu is presented to the subscriber. That is, the CPU 18 instructs the SFC 22 to locate the acoustic bullet point menu and this menu is provided to the TLI 14 for presentation to the subscriber. Subsequently, (step 86) the present invention waits for a response by the subscriber. Accordingly, the remaining steps 90 through 220 describe the processing performed by the present invention for each of the acoustic bullet point main menu options when such an option is selected by the subscriber pressing the corresponding key on his/her telephone.

Assuming the subscriber pressed key one for selecting the acoustic bullet point main menu option to hear the current segment (the current segment being that portion of the current voice message from either the beginning of the message, or from the immediately previous acoustic bullet point to the current voice interrupt), then from step 90, step 96 is performed. Accordingly, in this latter step, the CPU 18 instructs the TLI 14 to analyze the current message for any immediately previous acoustic bullet, or alternatively, locate the beginning of the voice message if no such acoustic bullet point is found. Subsequently, the TLI 14 plays back the current message from the position located within the voice message (either an acoustic bullet signal or from the beginning of the message). Following this step, the subscriber is again returned to step 84 so that another acoustic bullet point main menu options may be selected.

Alternatively, in steps 98 through 148, the processing for the present invention is described when the subscriber presses either the two key to send the current segment or alternatively, presses the three key to send the entire current voice message. Accordingly, if either of these keys are pressed, then in step 102, the CPU 18 instructs the SFC 22 to send the following prompt to the TLI 14 for presentation to the subscriber: "To append the current segment or the entire current message to be sent with a recorded message, press one; to send without comment, press two." Subsequently, in steps 104 and 108, a response from the subscriber is obtained and used to determine subsequent steps to be performed. In particular, if the two key was pressed by the subscriber for sending the current segment or the entire message without additional comments, then in step 110, a copy of the appropriate portion of the current (also denoted hereinafter the "original message") voice message is created by the TLI 14. Alternatively, if the subscriber pressed the one key for designating that additional comments are to be attached to the current voice message prior to being sent, then in step 112, the CPU 18 instructs the TLI 14 to record the subscriber's comments after presenting to the subscriber the prompt: "When you are finished recording, press #". Following step 112, in step 116, the TLI 14 records the subscriber's new comments until the subscriber presses the # key. Subsequently, in step 120, the TLI 14 creates a new message that is a combination of the newly recorded comments and either a copy of the entire current message, or a copy of the current segment. Further, note that the present invention also inserts one or more acoustic bullets to separate the newly recorded comments from the remainder of the new message.

Regardless of the path taken from step 108, step 128 is eventually encountered wherein the subscriber is prompted by the TLI 14 for either a message destination designation or for an indication that the newly created message should have its delivery delayed. Subsequently, assuming the subscriber entered, via telephone key presses, either a mailbox address or a # key press for delayed delivery, a determination is made in step 129 as to which of these options was selected. If the delayed delivery option was selected, then in step 130, the TLI 14 stores the incomplete message as a temporary message in a buffer (not shown) on the disk drives 30 and the present invention will only deliver this message upon input by the subscriber of a mailbox address. Note, however, that by temporarily storing this new message, the subscriber has the option of later attaching additional comments to the message prior to designating a delivery mailbox. Subsequently, in step 131, the subscriber is returned to reviewing the current message and control is redirected to step 75.

Note that in the event that the subscriber exits the voice messaging system 10 while there exists a temporary message in the buffer for delayed delivery, the voice message system 10 prompts the subscriber that an outgoing message is awaiting delivery and offers the subscriber the to review the message, to delete the message and exit, or to select a valid mailbox address for the message. Further note that not only messages generated via options 2 and 3 of the acoustic bullet point main menu are treated this way, but also during the option for key-press 7 when the subscriber requests to exit. Thus, no messages are lost without the subscriber being informed.

If, instead of delayed delivery, the subscriber entered a mailbox address, then in step 132, a determination is made as to whether the mailbox address is valid. If the mailbox address is determined to be invalid, then step 133 determines whether the subscriber is able to re-enter another mailbox address by re-performing steps 128 through 132. That is, the present invention allows the subscriber to re-enter a mailbox address up to three times before the present invention exits by taking the positive branch from step 133.

Alternatively, if at step 132 the mailbox address is determined to be valid (as one skilled in the art will understand), then step 136 is performed wherein the CPU 18 instructs the SFC 22 to send a prompt indicating that the subscriber should press the one key to confirm the mailbox address and to press the two key for the option to enter a different mailbox address, or alternatively, the subscriber is provided with the option to press the * key for exiting without sending the newly created message. Subsequently, assuming that the subscriber entered one of the three options provided in step 136, in step 140, a determination is made as to what key the subscriber pressed. Accordingly, if the one key was pressed, then the step 144 is performed wherein the CPU 18 places a notification of the newly created in the UPFC 26 for the mailbox having the specified mailbox address. Subsequently (also in step 144), the CPU 18 instructs the SFC 22 to send a prompt to the subscriber indicating that the newly created message was sent. Following step 144, in step 150, the CPU 18 instructs the SFC 22 to send an appropriate prompt to the subscriber indicating continuation of either the playback or recording of the current message and subsequently, as indicated, the flow of control loops back to step 84. Alternatively, if in step 140 the tone for the two key is detected, then the subscriber has requested to enter a different mailbox address. Accordingly, the flow of control reverts back to step 128. If, however, the tone for the * key is detected, then in step 148, the newly created message is deleted and a prompt is sent to the subscriber indicating that the new message has been cancelled. Subsequently, as with the branch for the detection of the one key tone, the step 148 is performed and the flow of control reverts back to step 84.

Figure 2B:
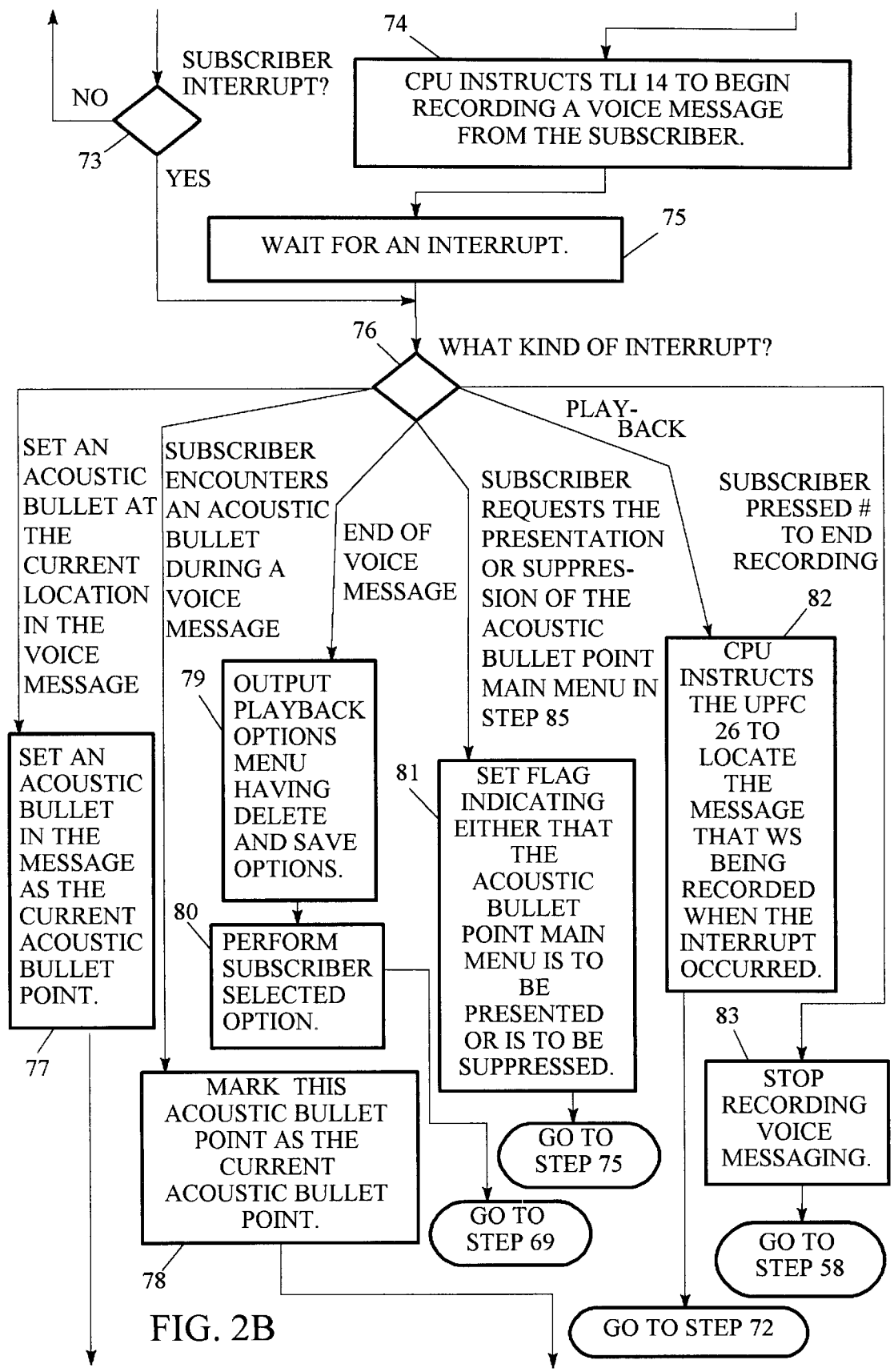
FIG. 2 is a flowchart of the steps performed by the present invention.
Figure 2C:
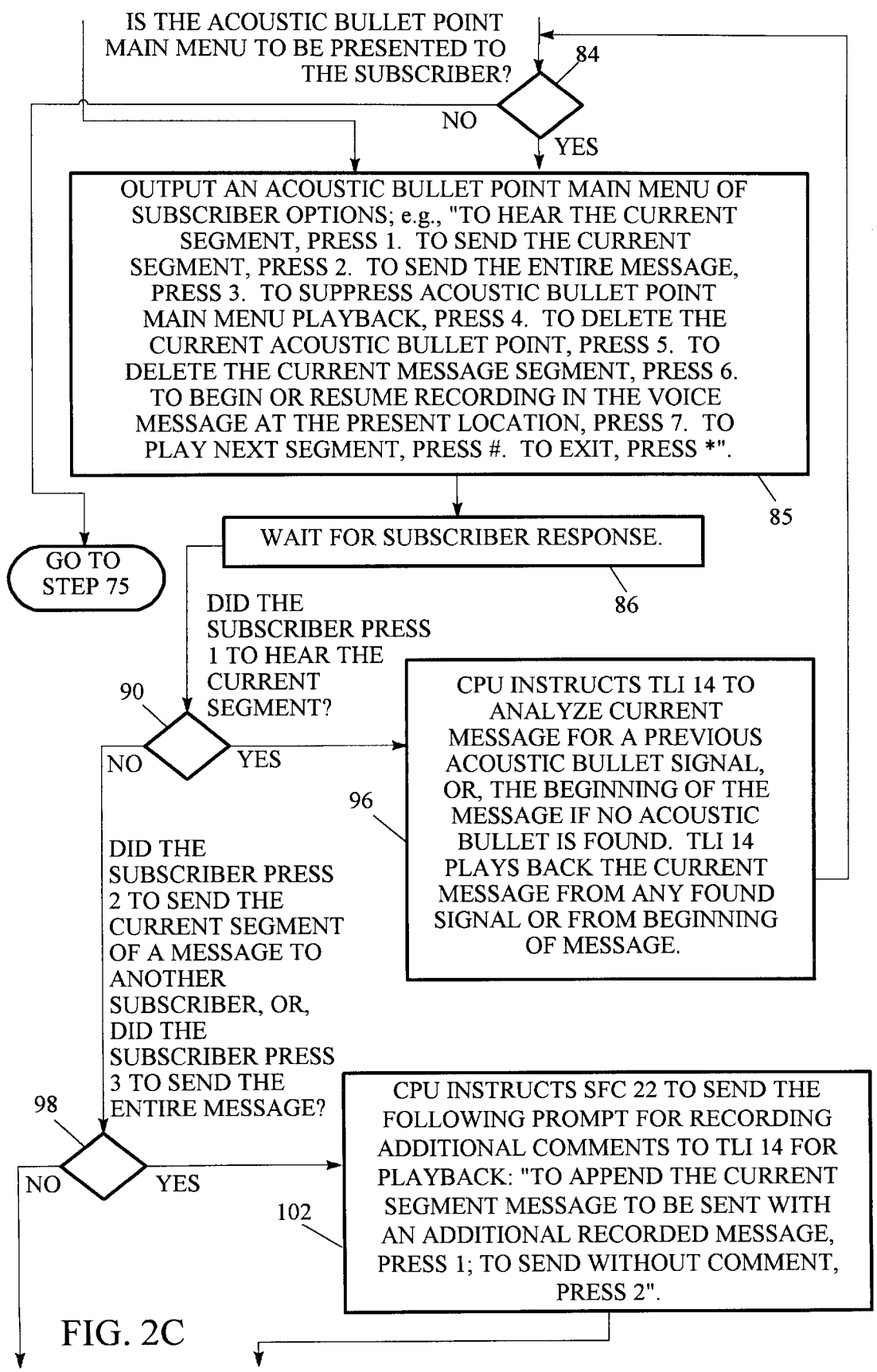
Figure 2D:
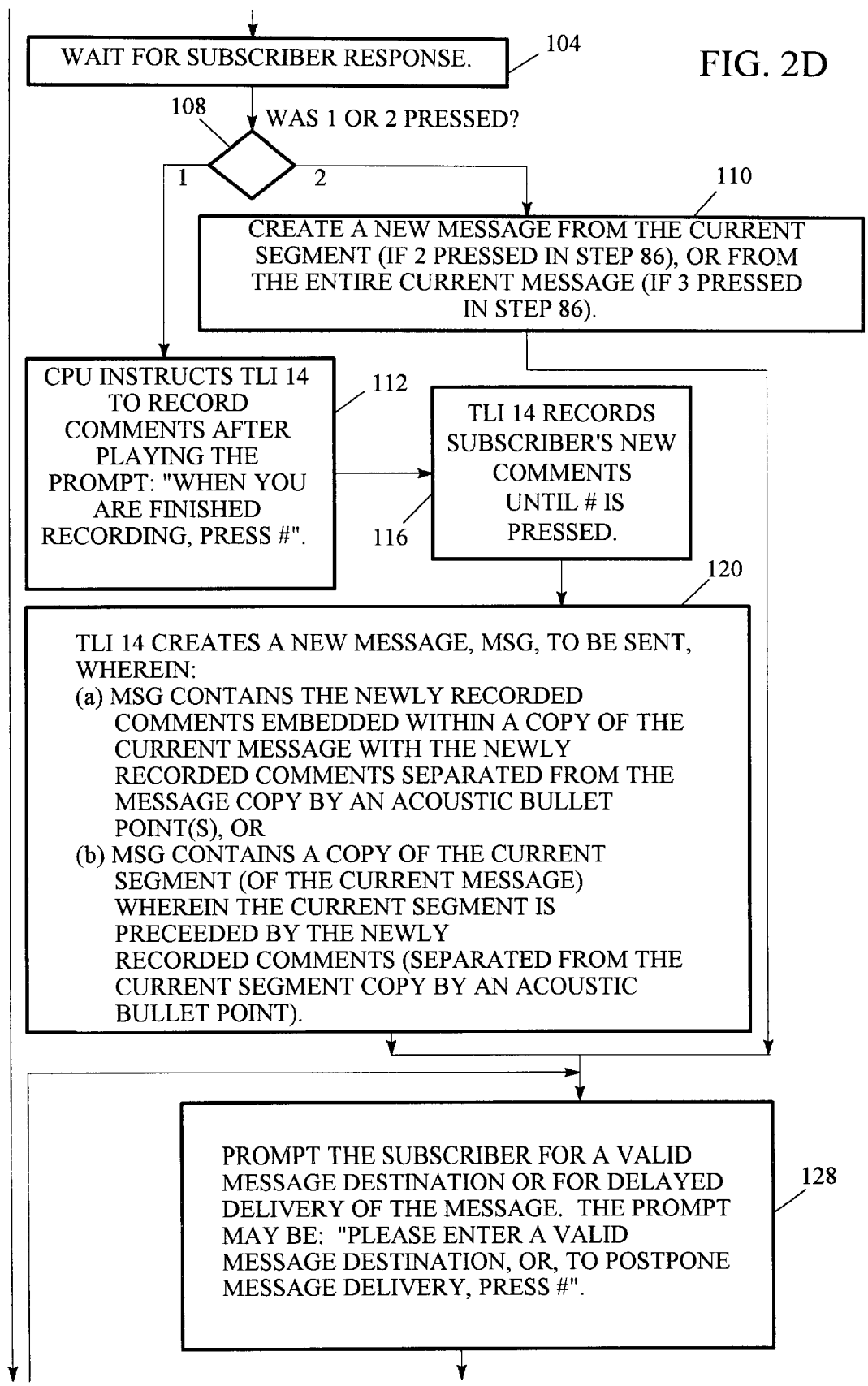
Figure 2E:
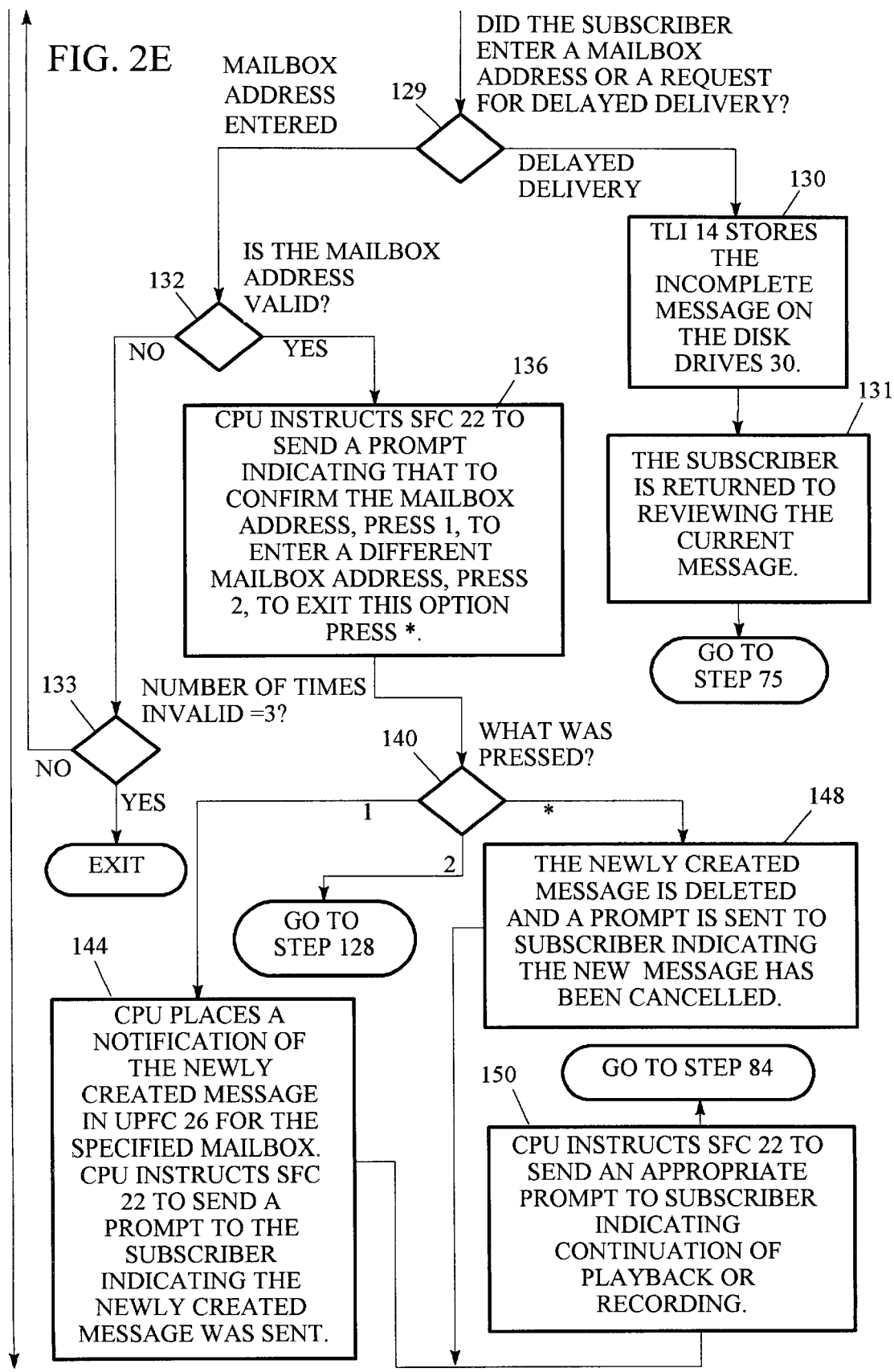
Figure 2F:
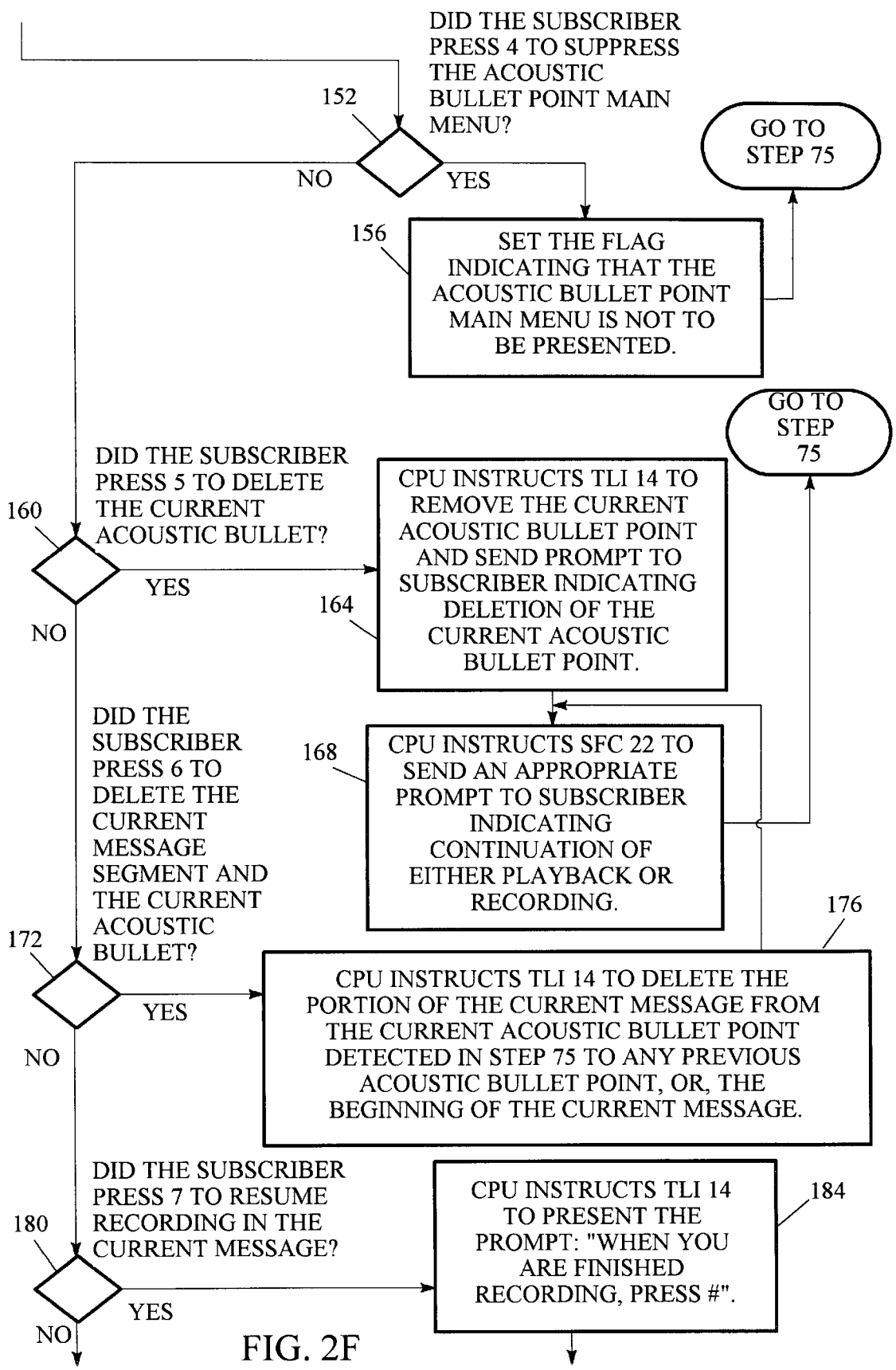
Figure 2G:
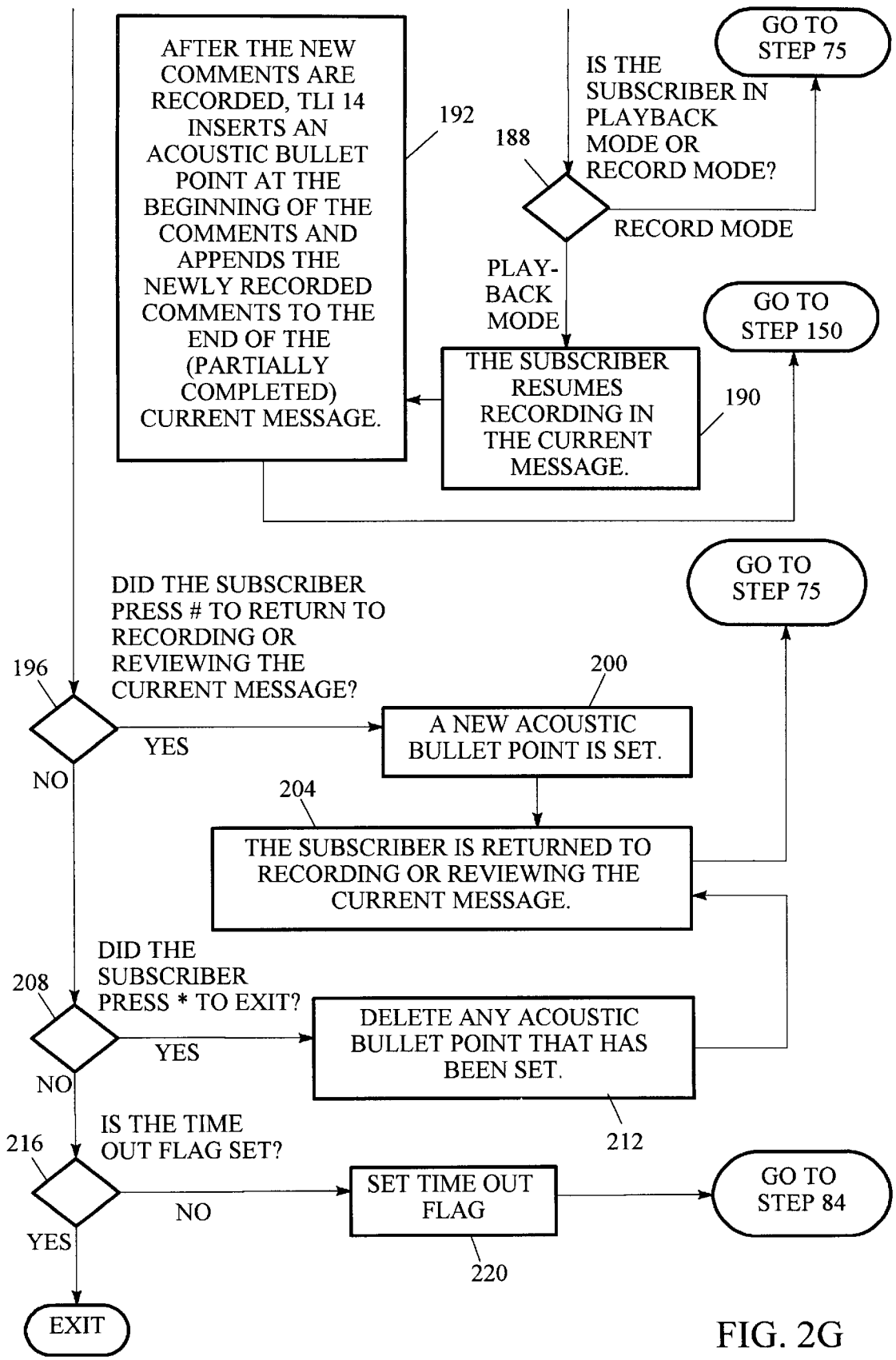

Referring now to FIG. 2F, in step 152, a determination is made as to whether the subscriber pressed the four key for turning off the presentation of the acoustic bullet point main menu. Note that in suppressing the playback of the acoustic bullet point main menu, the subscriber can listen to the current voice message without any pause upon encountering an embedded acoustic bullet in the message. Assuming that the four key was indeed pressed, in step 156, the flag (also referenced in step 81) is set to indicate that the acoustic bullet point main menu is not to be presented. Subsequently, the flow of control reverts back to step 75.

If the subscriber pressed the five key to delete the current acoustic bullet, then steps 160 through 168 are performed. Accordingly, once the test in step 160 determines that the five key was indeed pressed (i.e., detects the acoustic tone for the five key), then step 164 is performed for removing the current acoustic bullet and sending a prompt to the subscriber indicating deletion of the current acoustic bullet point. Following this, in step 168, the CPU 18 instructs the SFC 22 to send an appropriate prompt to the subscriber indicating either continuation of playback or recording for the current message. Then, as indicated, the flow of control reverts back to step 75.

If the subscriber pressed the six key corresponding to the option in the acoustic bullet point main menu, then the test in step 172 yields a positive result and step 176 is performed wherein the CPU 18 instructs the TLI 14 to delete that portion of the current message from the current acoustic bullet point detected in step 75 to any previous acoustic bullet point (or alternatively, the beginning of the current message if no previous acoustic bullet point is detected). Subsequently, in step 168, an appropriate prompt is again output to the subscriber indicating continuation of either playback or recording and then, the flow of control reverts back to step 75.

If the subscriber pressed the seven key to resume recording in the current message, then from step 180, step 184 is performed wherein the CPU 18 instructs the TLI 14 to present to the subscriber the prompt: "When you are finished recording, press #". Subsequently, in step 188, the present invention determines whether the subscriber is in playback mode or record mode. If the subscriber is in record mode, then the subscriber resumes recording in the current message and the flow of control reverts back to step 75. Alternatively, if the subscriber is in playback mode, then step 90 is encountered wherein the subscriber resumes recording in the current message, and after the new comments are recorded into the current message, the TLI 14 inserts an acoustic bullet point immediately prior to the recorded comments and then appends these newly recorded comments to the end of the current outgoing message. Following this step, step 148 is performed wherein the CPU 18 instructs the SFC 22 to send an appropriate prompt to the subscriber indicating continuation of playback.

If the subscriber pressed the # key in response to the acoustic bullet point main menu presentation of step 85, then this option allows the subscriber to return to the action underway prior to the currently detected interrupt that initiated the acoustic bullet point main menu. Note, however, that the currently detected acoustic bullet point remains intact within the voice message. Assuming the # key was pressed, steps 196 through 204 are performed so that the subscriber can return to recording or reviewing the current message. Accordingly, in step 200, a new acoustic bullet point is set at the current location in the current voice message. Following this, in step 204, the subscriber is returned to either recording or reviewing the current message. Note that the subscriber is returned to recording if the subscriber is in recording mode when step 75 was last performed and the subscriber is returned to reviewing or playing back the current message if the subscriber was in playback mode when step 75 was last performed. Following this step, as indicated, the flow of control reverts back to step 75.

Alternatively, if in response to the presentation of the acoustic bullet point main menu the subscriber pressed the * key to exercise the exit option of the acoustic bullet point main menu, then this option allows the subscriber to cancel the currently detected interrupt that initiated the acoustic bullet main menu. The cancel operation can involve deleting the active bullet, or leaving the active bullet intact. That is, the TLI 14 determines if the currently detected interrupt was initiated by a subscriber key-press or by an embedded acoustic bullet. In the case of a subscriber key-press, the TLI 14 removes the 500 millisecond burst of the DTMF tone for the current acoustic bullet. Note that this has the same effect as acoustic bullet main menu option 6. In the case that the currently detected interrupt (i.e., acoustic bullet) is an embedded bullet point, this acoustic bullet remains intact, thus having the same impact as acoustic bullet main menu option for the # key.

Thus, assuming the * key was pressed, from step 208, step 212 is performed wherein any acoustic bullet point that has been set during the present session of either playing back or recording the current message is deleted. Subsequently, step 204 is again performed and then the flow of control reverts back to step 75.

Finally, if none of the options of the acoustic bullet point main menu presented in step 85 are selected within a predetermined time period, then a determination is made in step 216 as to whether a flag has been set (denoted the time out flag) indicating that the present invention will no longer wait for the subscriber to select an option from the acoustic bullet point main menu. Accordingly, in this case, the present invention exits via the positive branch from step 216. However, if the time out flag is not set upon evaluation of step 216, then step 220 is encountered wherein the time out flag is set. Subsequently, the flow of control reverts back to step 84 thereby providing the subscriber with another opportunity to select an option from the acoustic bullet point main menu.

Note that in the event of no subscriber feedback, due to a loss of the connection via failure of a data-communications link or inactivity on the part of the subscriber, the TLI 14 enters a state awaiting for an additional subscriber initiated session.

Figure 3A:
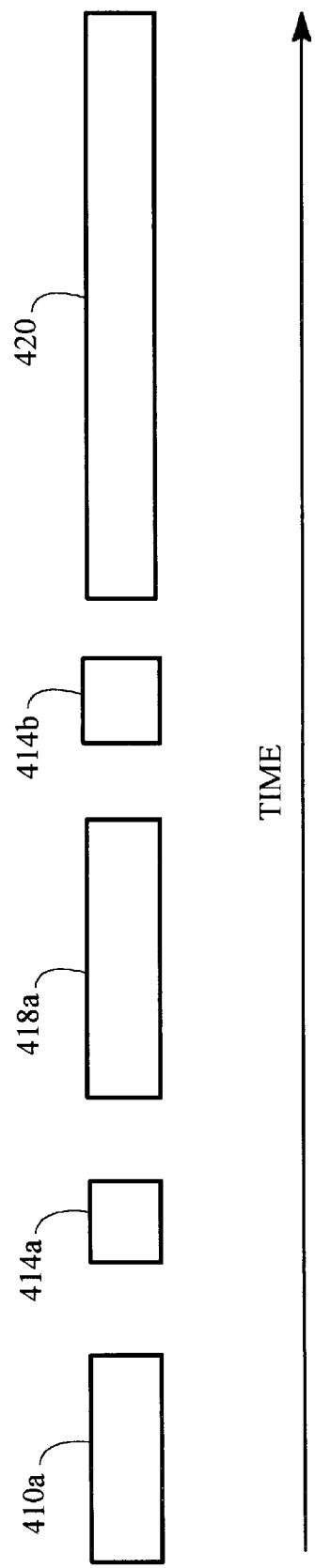
FIGS. 3A and 3B illustrate voice messages generated by the present invention wherein these messages include acoustic bullet points.
Figure 3B:
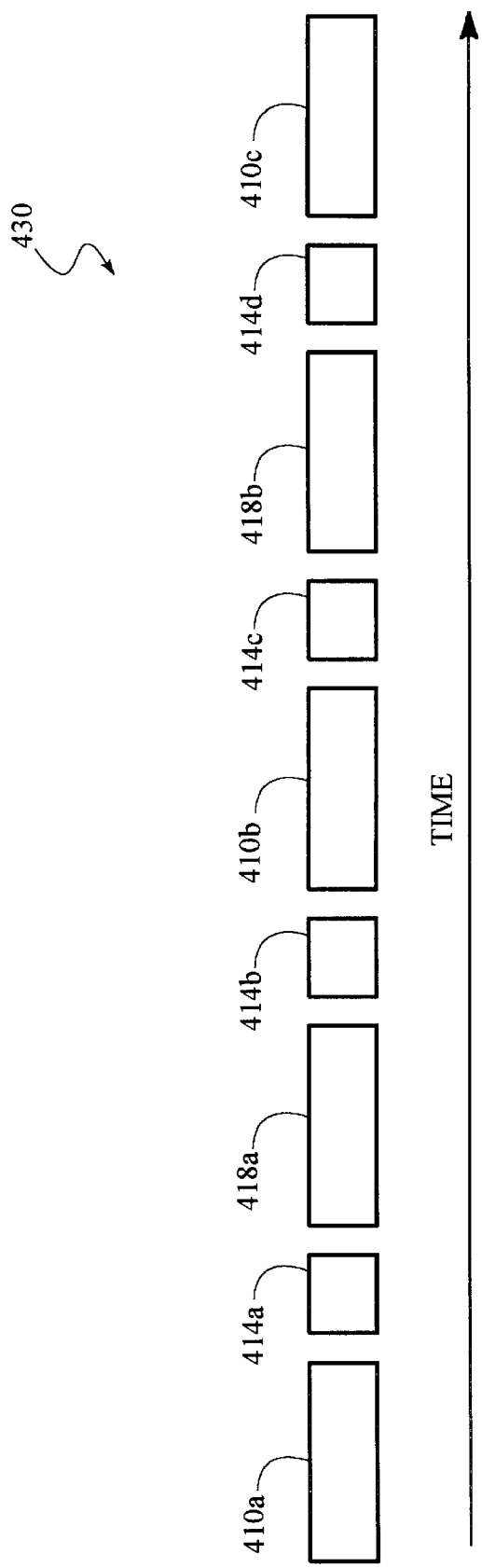

As an example of the operation of the present invention, reference is made to FIGS. 3A and 3B which illustrates a voice message with embedded acoustic bullets. In particular, FIG. 3B represents a resulting voice message wherein a subscriber elects to send an entire received voice message with comments (i.e., acoustic bullet point main menu option 3); however, before sending it, the subscriber adds further comments (via acoustic bullet point main menu option 7), as a response to the originating party or to a third party. Note that all references to specific time lengths for this example are approximations.

Commencing with the example, the subscriber begins reviewing an incoming message ninety seconds in length consisting initially of only segments 410*a*, 410*b* and 410*c*. The subscriber subsequently enters an acoustic bullet point interrupt 414*a* at thirty seconds into the message being reviewed (by pressing the six key whose DTMF tone is detected in step 75 of FIG. 2B). Subsequently, when the acoustic bullet point main menu is present (step 85), the subscriber selects acoustic bullet main menu option to send the entire message (the three key) and then presses the one key for requesting to append additional comments to the message (step 102). Accordingly, the subscriber records thirty seconds of new comments 418*a* into the original message, thus creating a new message (FIG. 3A) with an acoustic bullet 414*a* separating the segment 410*a* from the new comments 418*a*, and another acoustic bullet 414*b* separating the new comments 418*a* from the last sixty seconds of the original message 420. The total time for the new message at this point is 120 seconds. Assume that the subscriber postpones delivery of the newly created message and returns to reviewing this message. Subsequently, also assume that the subscriber enters another acoustic bullet point interrupt 414c at sixty seconds into the message being reviewed. Accordingly, when the acoustic bullet point main menu is presented again (step 85) as a response to entering the second acoustic bullet, the subscriber may select menu option (7) and thereby record thirty seconds of additional comments 418b into the message. Subsequently, if the subscriber selects to deliver the newly created message of FIG. 3B, the final composition of this message to be delivered will total approximately 150 seconds and be composed as follows: thirty seconds of incoming message 410a, acoustic bullet point 414a, thirty seconds of embedded comments 418a, acoustic bullet point 414b, thirty seconds of incoming message 410b, acoustic bullet point 414c, thirty seconds of additional comments 418b, a separating acoustic bullet point 414d, and a final thirty seconds of the original message 410c. The four acoustic bullet points inserted by the subscriber will add 2000 milliseconds to the overall length of the new outgoing message 430 since each acoustic bullet is 500 milliseconds in duration.

What is claimed is:

1. A method for editing voice messages, comprising:
   inserting, by a first subscriber, a predetermined acoustic tone in a telephony network as an interrupt at a subscriber selected point during a playing of a first voice message, wherein said interrupt partitions said first voice message into a first portion of said voice message prior to said interrupt and a second portion of said voice message after said interrupt;
   playing said first voice message by a particular subscriber, wherein the particular subscriber is one of the first subscriber and a different second subscriber;
   detecting said inserted interrupt during said step of playing;
   performing a change in said first voice message to obtain a first new version of said first voice message, wherein said change includes at least one of the following steps (A1), (A2), (A3), (A4) and (A5):
   (A1) modifying said first portion for inclusion in said first new version;
   (A2) deleting said first portion while including said second portion in said first new version;
   (A3) modifying said second portion for inclusion in said first new version;
   (A4) deleting said second portion while including said first portion in said first new version; and
   (A5) embedding an additional voice message portion between said first and second portions; and
   transmitting said first new version to a third subscriber.

2. A method as claimed in claim 1, further including a step of receiving, by one of the first and second subscribers, the first voice message by dialing a predetermined telephone number for activating a telephony voice messaging system.

3. A method as claimed in claim 1, wherein said step of inserting includes entering, by the first subscriber, a predetermined telephone code at the subscriber selected point in said first voice message.

4. A method as claimed in claim 1, wherein said step of detecting includes:
   detecting said predetermined acoustic tone by the telephony network during said step of playing; and
   stopping the playing at said predetermined acoustic tone.

5. A method as claimed in claim 1, wherein said step of inserting includes outputting an audio performance of at least a part of said first portion immediately prior to the subscriber selected point.

6. A method as claimed in claim 1, wherein said step of playing includes sending a first voice message to said second subscriber when said second subscriber is the particular subscriber.

7. A method as claimed in claim 1, wherein said step of detecting includes:
   stopping the playing of said first voice message when said interrupt is detected.

8. A method as claimed in claim 1, wherein said step of performing includes prompting the particular subscriber for a selection from a menu, wherein said menu includes commands for editing the first voice message to obtain said first new version.

9. A method as claimed in claim 8, wherein said menu includes subscriber selectable items for performing at least some steps of (A1), (A2) and (A3), (A4) and (A5).

10. A method as claimed in claim 8, wherein said step of performing includes invoking one of said menu options by transmitting a predetermined tone through a telephony network.

11. A method as claimed in claim 10, wherein said predetermined tone corresponds to a tone for transmitting a telephone number digit.

12. A method as claimed in claim 1, wherein said step of inserting includes a press of a telephone number digit by the first subscriber.

13. A method as claimed in claim 1, further including the step of repeating said steps of performing and transmitting for obtaining a second new version of the first voice message that is different from said first new version and transmitting said second new version to a fourth subscriber different from said third subscriber.

14. A method as claimed in claim 13, wherein said step of repeating includes providing said second new version with one or more additional interrupts.

15. A method as claimed in claim 1, wherein said step of performing includes inserting one or more additional interrupts between portions of said first new version of said first voice message.

16. A method as claimed in claim 15, further including the step of playing said first new version by the third subscriber, wherein the playing of said first new version stops at an inserted interrupt in said first new version of said first voice message.

17. A method for editing a voice message, comprising:
   activating an audio performance of a voice message at a telephony station;
   inserting one or more interrupts, wherein said interrupts comprise a predetermined audio tone, at corresponding points selected by a first subscriber, into the voice message during said step of activating by transmitting a series of one or more telephone number digit tones to a telephony network, wherein each said interrupt segments said voice message into a corresponding first portion of said voice message prior to the interrupt and a second portion of said voice message after the interrupt;
   storing a new version of said voice message having said one or more interrupts;
   transmitting said new version to a second subscriber, wherein upon the second subscriber playing said new version, the playing pauses at each of said interrupts.

18. A method as claimed in claim 17, further includes, when a first interrupt of said interrupts is encountered, performing of one of the following steps:
   (B1) modifying said corresponding first portion for inclusion in said new version;
   (B2) deleting said corresponding first portion while including said corresponding second portion in said first new version;

(B3) modifying said corresponding second portion for inclusion in said new version;

(B4) deleting said corresponding second portion while including said corresponding first portion in said new version; and (B5) embedding an additional voice message portion between said corresponding first portion and said corresponding second portion.

19. A method as claimed in claim 17, further including a step of presenting an audio presentation of a menu for activating at least some of the following:

(a) playing a part of said first portion adjacent to said interrupt;

(b) transmitting, to another subscriber, at least a part of said first portion adjacent to said interrupt;

(c) sending said new version of the voice message to another subscriber;

(d) replaying the voice message from the beginning;

(e) deleting the interrupt from the voice message;

(f) deleting a part of said first portion adjacent to the interrupt;

(g) recording an additional voice message for inserting between said first portion and said second portion;

(h) commencing to play said second portion from the beginning of said second portion;

(i) retrieving a next voice message for activating an audio performance thereof.

20. A method as claimed in claim 17, further including a step of removing one of said interrupts from one of: (a) the voice message by the first subscriber, and (b) the new version by the second user.

21. A method as claimed in claim 17, wherein each operation of a voice messaging system that is applicable to the voice message is also applicable to the new version.

* * * * *